United States Patent [19]

Kristinsson

[11] Patent Number: 5,149,296
[45] Date of Patent: Sep. 22, 1992

[54] MACHINE FOR PROCESSING BELLY FLAPS FROM A FRONT PART OF A FISH

[75] Inventor: Sigurdur Kristinsson, Reykjavik, Iceland

[73] Assignee: Jonatan HF, Reykjavik, Iceland

[21] Appl. No.: 735,895

[22] Filed: Jul. 25, 1991

[30] Foreign Application Priority Data

Oct. 11, 1990 [IS] Iceland ....................... 3638

[51] Int. Cl.$^5$ .............................................. A22C 25/14
[52] U.S. Cl. ...................................... 452/108; 452/155
[58] Field of Search ............... 452/106, 108, 118, 155, 452/121

[56] References Cited

U.S. PATENT DOCUMENTS

| | | | |
|---|---|---|---|
| 4,583,265 | 4/1986 | Kristinsson | 452/155 |
| 4,649,603 | 3/1987 | Bartels | 452/121 |
| 4,837,898 | 6/1989 | Hartmann et al. | 452/119 |
| 4,979,268 | 12/1990 | Kure | 452/108 |
| 5,026,318 | 6/1991 | Jahnke | 452/116 |

*Primary Examiner*—Willis Little
*Attorney, Agent, or Firm*—Nies, Kurz, Bergert & Tamburro

[57] ABSTRACT

A method and a machine for processing belly flaps from a front part of a fish which has been parted into a rear part and a front part. According to applicant's co-pending U.S. application Ser. No. 716,738, it is known to move by spiked chain at each side, the front part of a fish with the belly foremost and the head farthest back, along a fixed straight track to a fixed U-shaped beam, which is a belly scraper. The belly of the front part is threaded upon the belly scraper which scrapes the inside of the belly cavity so that the entrails are loosened from the front part and moved into and along the belly scraper. The leading end part of the belly scraper has a knife edge and an elevation in the floor, and cuts the pectoral nose from the gills and the tongue so that the tongue moves into the belly scraper, which pierces downward and out from the head through the pectoral nose. The jaw bones move on top of the belly scraper along its upper edge, and the belly flaps move to the sides. At the sides of the belly flaps are horizontal slides which extend in the direction of movement to elevate the gill lids and cheeks, away from the belly flaps. Knives under the slides, and above the belly scraper cut into and between the belly flaps and the head to free the belly flaps. The belly scraper leading edge knife cuts the pectoral nose from the head. The freed belly flaps fall into a tub and the head moves forward, along the belly scraper to its end, and carries the entrails with it to drop in a tub at the end of the apparatus.

8 Claims, 3 Drawing Sheets

MACHINE FOR PROCESSING BELLY FLAPS FROM A FRONT PART OF A FISH

The invention regards a front part 1 with belly flaps 12, whether or not the pectoral nose 9 is cut, and the pectoral bond 20 between the lower ends of the pectoral bones 19 is cut. The invention regards the separation of the belly flaps 12 from other parts of the front part 1, head 18 and spine 2.

An uncut pectoral circle, uncut pectoral bond 20, prevents the removal of the gills by known methods and equipment.

The organs 4, 5 and 6 in the belly and most often the cheeks 13 must be separated from the belly flaps 12 for processing of jam, among other reasons because of different color.

PROCESSING OF A FRONT PART

In the processing of salmon, trout, redfish and some other species of fish, the first step of the process is to cut the fish in two parts by a cut behind the pectoral bones and pectoral fins. In this way a front part and a rear part are formed. This called "parting". The rear part is cut into flitches, where as the front part is processed for meal. The present inventor has invented and made a machine the subject of copending U.S. application Ser. No. 714,898, filed Jun. 17, 1991, and based on (Icelandic application nr. 3596 for a patent) for processing the nape muscles 7a from the front part 1, before the headbone 13 and the spine 2 are separated by another machine see copending U.S. application Ser. No. 713,738, filed Jun. 18, 1991 and based on (Icelandic application nr. 3597 for a patent), by the same inventor hereof. In those specifications the general processing of fish and cuts into the flesh of a fish are explained, and a reference to those explanations is preferred.

KNOWN MACHINES

Machines for processing a front part of for example cod, where the pectoral nose 9 and the pectoral bond 20 have been cut, are not applicable for processing a front part 1, where the pectoral nose 9 and the pectoral bond 20 are whole. On the other hand a machine according to the present invention is suitable for processing both.

No machines are known for processing belly flaps 12 from a front part, whether or not the pectoral nose and the pectoral bond have been cut. There are known machines for removing headbone and gills 10 from a head 18, where the pectoral bones 19 either are missing, or the pectoral nose 9 or the pectoral bone 20 has been cut. There the "pectoral circle" is not present. In that case the mouth is slipped upon a hollow shaft. Out fron the shaft there are expelled two beams in front of the gills, retaining the gills 10 and tearing the gills 10 from the head 18, when the head is moved forwards along the track 21. This method and this equipment is inapplicable, if the pectoral bond 20 is whole. In that case the pectoral bones and the pectoral bond, together with the head above, form a circle around the shaft, a pectoral circle. If the circle remains whole and is separated above and beneath, the belly flaps will belong to the gills into waste. If the circle is separated above, the gills will belong to the belly flaps 12. If the circle is separated beneath, the pectoral bond breaks, the belly flaps will belong to the spine into waste.

Anyhow the organs 4, 5, and 6 would not be separated from the belly flaps 12. Then the purpose is not obtained, to separate the belly flaps 12 from other parts of the front part 1. Therefore the machine would be inapplicable.

There is known according to my afore-mentioned copending U.S. Pat. application Ser. No. 716,738, a belly scraper 16 with a gill knife at front, which separates oragns 4, 5 and 6 and gills 10 from other parts of the head 18, so that these belong to the headbone, when a cut has been made into the throat. Such a belly scraper does not reach the purpose of the present invention. It does not cut the pectoral nose 9 apart.

Besides the belly scraper 16, which is formed like a U-formed beam, a machine according to the invention includes a known transport track, along which the front part 1 is moved by means of spiked chains 29. To adapt to different sizes of front parts, a spiked chain opposite the head 18 is mounted elastically for up and down movement. The spiked chain 29 is mounted on a horizontal axle in front of the knives 30, and can oscillate around it for for springing up and down over the track. All this equipment is known from my copending U.S. application Ser. No. 716,738.

THE INVENTION

The purpose of the invention is to separate belly flaps 12 from other parts of the front part 1. That purpose is according to the invention reached by an elevation 26 in the floor of the belly scraper 16, which elevation elevates the gill archs 10 and thereby the head 18 and the tongue 8 in relation to the belly scraper and the pectoral nose 9, so that the pectoral nose 9 is directed towards the knife 17 and is cut apart. The belly scraper 16 is outfitted with a special new tip, a pectoral nose knife 17 foremost on the belly scraper 16, which cuts downward out from the head 18 under the tongue 8 and thus cutting apart the pectoral nose 9 behind the radix of the tongue 8, and thus separting the belly flaps 12 from the head 18 undermost. Thereby the foremost part of the belly flaps 12, the pectoral nose 9, has been cut free from the head 18. Along and at each side of the belly scraper 16 (see FIGS. 12 and 13) there are arranged slides 31 which engage and elevate the gill lids 14 and the cheeks 13 up to a level with the spine 2. There are also arranged horizonal knives 30, which engage and cut below the gill lids 14 and into the throat and belly cavity 3 of the front part, and thus separate the belly flaps 12 only from all other parts of the front part 1.

DESCRIPTION OF THE PREFERRED METHOD AND APPARATUS

Figure 1:
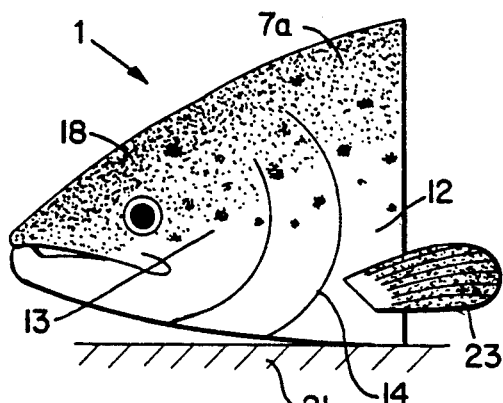
FIG. 1 is a side view of the front part of a fish.

FIG. 1 illustrates in a side view a front part 1, head 18, belly flaps 12, cheek 13, pectoral fin 23 and gill lids 14.

Figure 2:
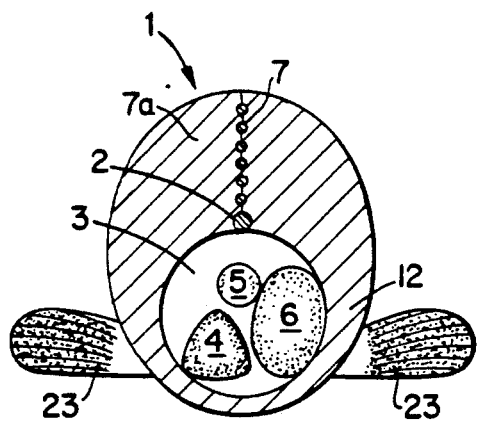
FIG. 2 is a rear right-hand view of the front part seen in FIG. 1.

FIG. 2 illustrates the front part 1 from behind. Under the spine 2 with the spinal crest 7 is the belly 3 with the heart 4, liver 6 and stomack opening 5. The belly flaps 12 and pectoral fins 23 are also illustrated.

Figure 3:
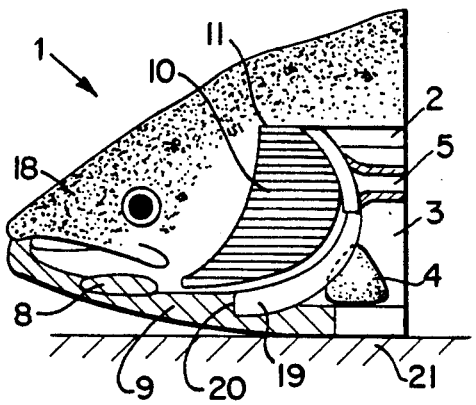
FIG. 3 is a side view similar to FIG. 1 with parts of the surface over the gills and belly removed.

FIG. 3 illustrates in a side view a front part, where a part of the surface has been removed. The upper ends of the gill archs 10 are joined to the headbone by upper joints 11. The lower ends of the gill archs 10 are at the radix of the tongue 8. Behind the radix of the tongue is the pectoral nose 9, which connects the pectoral bones 19 and the belly flaps 12 to the head. Between the lower ends of the pectoral bones 19 is the pectoral bond 20. The figure further illustrates the spine 2, belly 3, heart 4 and the stomach opening 5.

Figure 4:
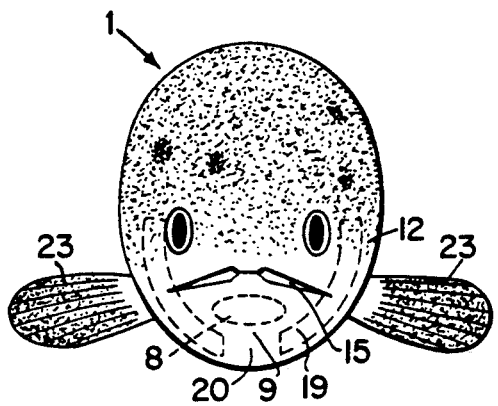
FIG. 4 is a front left hand view of the front part shown in FIG. 1.

FIG. 4 illustrates a front part 1 in front view. Inside the mouth 15 is the tongue 8, which at the radix of the tongue is joined to the pectoral nose 9. Behind the pectoral nose 9 is the pectoral bond 20, which connects the foremost ends of the pectoral bones 19.

Figure 5:
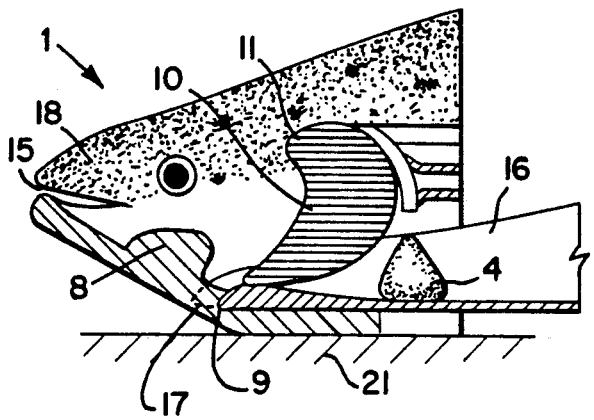
FIG. 5 is a side view of the front part similar to FIG. 3 but illustrates the nose knife starting to cut the pectoral nose.

FIG. 5 illustrates the mouth 15 with the tongue 8, where the radix of the tonque 8 is connected to the belly flaps 12 (FIG. 1) by the pectoral nose 9, which according to the invention is cut by a pectoral nose knife 17, which is foremost on the belly scraper 16.

Figure 6:
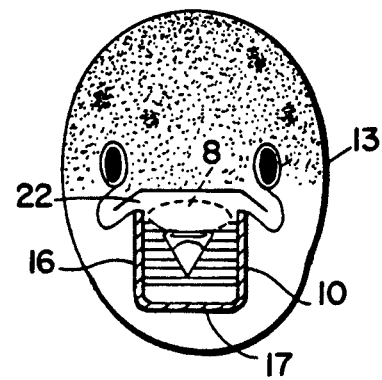
FIG. 6 is a front left hand view of FIG. 5, with the nose knife cut through the pectoral nose.

FIG. 6 illustrates in front view a front part 1, where the pectoral nose knife 17, foremost on the belly scraper 16, has cut through the pectoral nose 9 (FIGS 3 to 5) and has penetrated from the head 18, so that the jaw bones 22 are above the belly scraper 16, whereas the gills 10 and organs are in known way inside the belly scraper 16.

Figure 7:
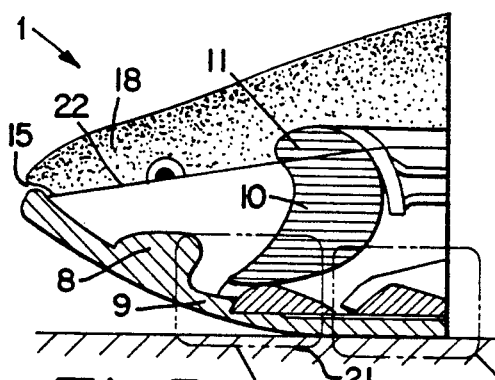
FIG. 7 is a special depiction similar to the side view of FIG. 5 but shows two different positions of the nose knife.
Figure 7B:
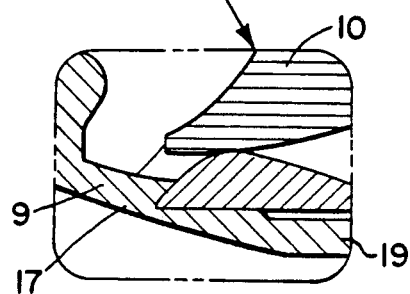
FIGS. 7a and 7b are two enlarged detailed side views from FIG. 7 showing the two positions of the nose knife.
Figure 7A:
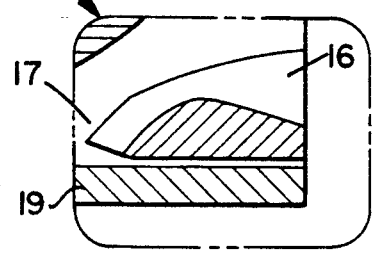

FIG. 7 illustrates a front part in a side view and for clarity shows the pectoral nose knife 17 in two positions (see enlarged detail FIGS. 7b and 7a) on its way to the pectoral nose 9. In the foremost position the pectoral nose knife 17 glides along the inner side of the belly cavity. The knife is bevelled upwards at the tip like a ski to prevent the tip sticking into the flesh. The floor of the belly scraper 16 has inclination 25 and an elevation 26 (FIG. 8), which strikes the gill archs 10 and elevates the head 18 (FIG. 5), the tongue 8 and the pectoral nose 9 in front of the knife 17, so that the knife 17 has a direction through the pectoral nose 9 and cuts it apart. This is better illustrated in the enlarged position, FIG. 7a.

Figure 8:
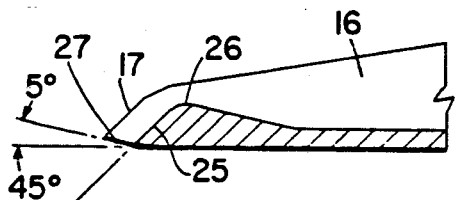
FIG. 8 is a vertical sectioned detail side view of the nose knife front part of the belly scraper.

FIG. 8 is an enlarged detail vertical section of the foremost part of the belly scraper 16, the pectoral nose knife 17. A suitable bevel 24 reaches about 15 mm into the lower side corners of the scraper and is about 5 degrees. The floor of the scraper is indented (see FIG. 10) about 7 mm in the middle and a suitable inclination is about 45 degrees up to the elevation 26.

Figure 9:
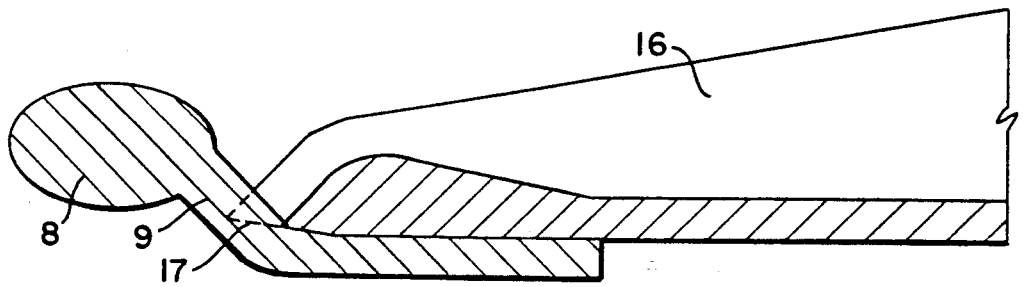
FIG. 9 is an enlarged detailed side sectioned view which shows the nose knife and the tonque and pectoral nose of the front part of the fish.
Figure 10:
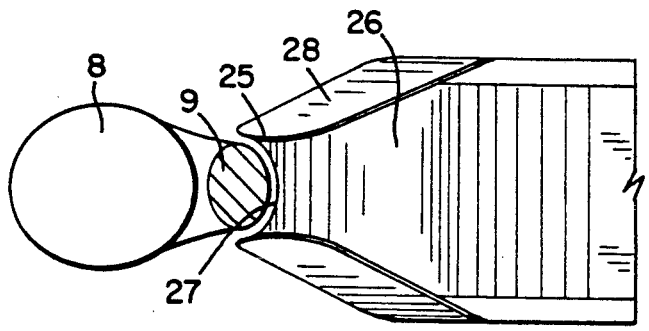
FIG. 10 is an enlarged detailed top view of FIG. 9.

FIG. 9 is sectional detail view which illustrates the belly scraper 16 with the knife 17, tongue 8 and pectoral nose 9 in a side view and FIG. 10 illustrates from above the pectoral nose 9 having arrived to the knife 17 and the tongue 8 has been elevated by the gill archs 10 (FIG. 7), when they strike the elevation 26 in the floor of the belly scraper 16. FIG. 10 illustrates further the expected cut in crosssection through the pectoral nose 9.

The floor of the belly scraper is indented around 7 mm and the width is around 12 mm and this part forms a knife edge 17, which cuts the pectoral nose 9.

On its way to the pectoral nose 9 the tip of the belly scraper 16 bumps into the gill-lid-bones into which the pins of the gill lids are fixed. If the gill-lid-bones get under the belly scraper 16, they will prevent the elevation of the head and thus act opposite the gills, which elevate the head, and in that case the belly scraper moves out through the mouth 15 and does not cut through the pectoral nose 9. In order to prevent this, the foremost side parts of the belly scraper are tapered 28. The taper turns each gill-lid-bone, so that its lower end moves outward and the upper end moves inward, it thus attempts to elevate the head and cooperate with the gill archs 10, so that the knife 17 penetrates out from the head through the pectoral nose 9.

Figure 11:
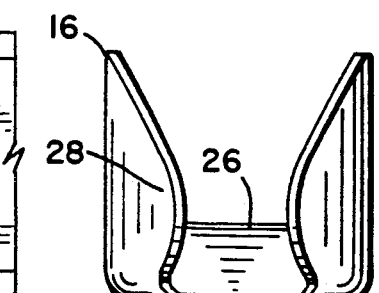
FIG. 11 is an enlarged detail front end view of the belly scraper.

FIG. 11 illustrates the foremost part of the belly scraper 16 in a front view. The foremost part is tapered 28 in order to turn the gill-lid-bones. The knife 17 cuts the pectoral nose 9, and the elevation 26 elevates the gill archs 10 and thereby the head and the tongue 8 in relation to the knife 17 and the pectoral nose 9, so that the pectoral nose is directed to the knife 17 and will be cut.

Figure 12:
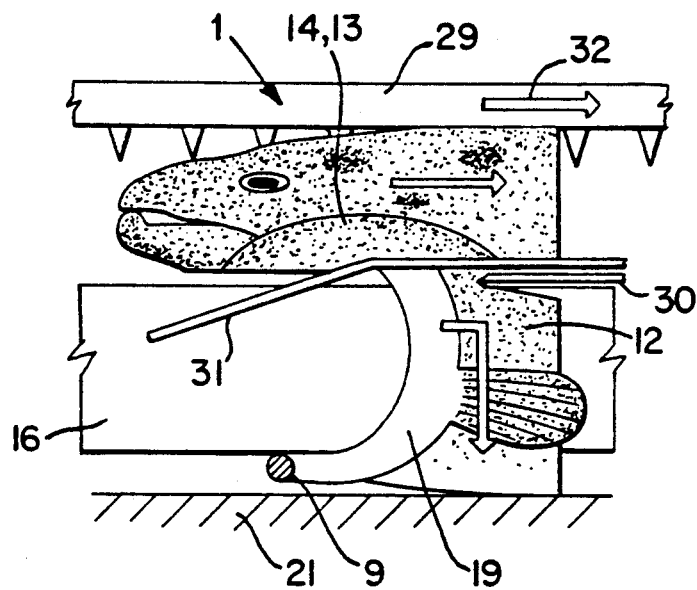
FIG. 12 is a side view of a machine in somewhat schematic detail with the front part of a fish moved partially along the belly scraper.
Figure 13:
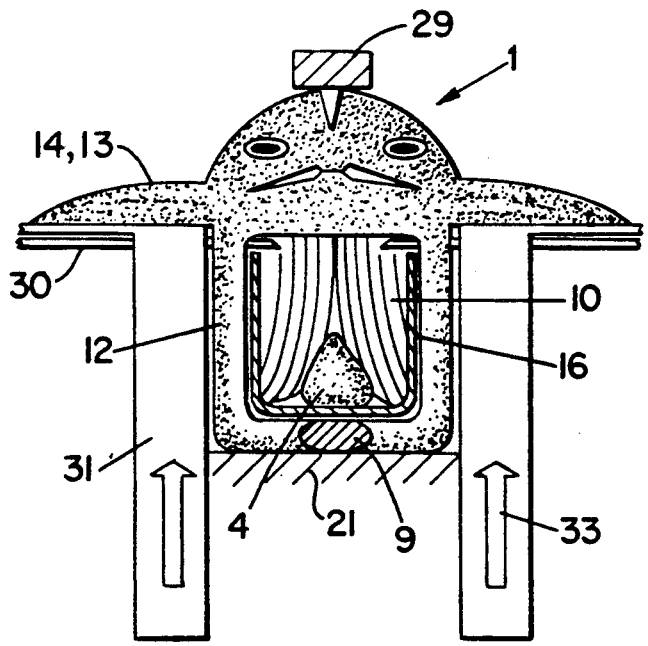
FIG. 13 is a rear view of the machine as seen from the left of FIG. 12.

FIG. 12 illustrates a machine according to the invention in a side view and FIG. 13 in a rear view. The front part 1 is moved, by a known overlying horizontal spiked chain 29, along the belly scraper 16, which forms a fixed track for the front part 1. The belly scraper 16 enters into the belly cavity 3 from behind. Parallel to the belly scraper 16 are the slides 31 for the cheeks, which are inclining upward in the direction of motion 32, 33 and elevate the gill lids 14 and the cheeks 13 (FIG. 1) up to a level above the highest edges of the belly scraper 16 and belly flaps 12. The cheeks 13 are moved along the slides 31 in the direction 33. The foremost part of the slides 31 is horizontal and under that part and above the belly scraper 16 are knives 30, which cut the pectoral bones 19 and the belly flaps 12 from the front part 1, and they fall down into a tub for belly flaps 12. The gills 10, heart 4 and other organs are in known way inside the belly scraper 16 and are pulled forward by the head 18, which by the spiked chain 29 is moved forward to the end of the belly scraper 16, where it falls down into a tub for waste.

The spike chain 29 is in a known way powered by a shaft having respective motor. The axles of the spiked chain 29 are in a known manner from copending U.S. Application Ser. No. 714,898 (Icelandic Application nr. 3596 for a patent) through bearings connected together by a beam, which can oscillate around an axis, and is connected to a spring, which pulls it toward the track, so that the chain can spring and adapt to front parts of different sizes. The knives 30 are by known overlying bevel gears powered by a motor mounted on the frame of the machine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed or desired to be secured by Letters Patent is:

1. A method for cutting belly flaps from a front part of a fish which part includes the belly with its contained organs, the belly flaps, gill lids, cheeks, the gill arches, tongue and its radix, and the pectoral nose and bones and related items, said method comprising: moving, by means of horizontal drive means which engage the front part with the belly of the front part facing forward in the direction of movement along a straight transport track onto a cantilevered beam comprising a belly scraper, which is an elongated U-formed beam directed opposite to the moving direction of the front part with the foremost end of the belly scraper, which will be opposite the lower joint of the gill arches, being a knife; continuing the movement of the front part so its belly and contained organs move over the U-formed beam; elevating, by engaging with an elevation structure in the floor of the U-formed belly scraper, the lower joint of the gill arches and thereby the body and the radix of the tongue, so that the pectoral nose faces the knife end; and continuing moving of the front part so the pectoral nose moves into and past the knife, whereby the knife end of the belly scraper is caused to penetrate into the front part and through the pectoral nose, so that the jaw of the front part is moved along and above the upper edge of the U-formed belly scraper, and the belly scraper thereby separating the main part of the head from the foremost end of the belly flaps.

2. A method according to claim 1, further including the steps of engaging and moving the gill lids and cheeks, along control planes and slides, which are inclined upwards and sidewards and are located at the sides of the belly scraper as the front part is continued to be moved along the transport track making the gill lids and cheeks pass outside of the sides of the U-formed belly scraper beam and causing the gill lids and cheeks to be elevated up to a level above the upper most edges of the belly flaps thereby resulting in a straight cutting plane through the upper most edges of the belly flaps.

3. A method according to claim 2, further including the steps of continued moving of the head, the elevated gill lids and cheeks, and the belly flaps along the belly scraper beam past horizontal cutting knives situated on the cutting plane through the uppermost edges of the belly flaps, which horizontal knives are at and above the uppermost edges of the U-formed belly scraper beam and, as the front part is moved further down the track, cutting the belly flaps free from the other parts of the front part, so that the freed belly flaps fall away from the front part and the other parts of the front part are moved further along the track and pass into a container for waste.

4. Equipment for performing a method according to claim 1, comprising: a straight transport track, a cantilevered U-formed elongated beam above the track and comprising a belly scraper of U-shaped cross-section having a floor wall and two upstanding side walls which become disposed in the belly cavity of the front part as it is moved over the belly scraper, the front end edges of the floor wall and side walls of the belly scraper are knife edges which cut what is pushed over the belly scraper, the foremost ends of the sidewalls of the belly scraper are converged forwardly to prevent the knife from penetrating into the flesh of the walls of the belly cavity as the front part passes onto and along the belly scraper beam.

5. Equipment as defined in claim 4, wherein said belly scraper floor wall includes an elevation structure at its front end which is to elevate the lower joints of the gills, together with the tongue and radix of the tongue relative to the pectoral nose so that the pectoral nose becomes cut apart, as the front part moves onto the belly scraper and the belly scraper penetrates the front part under the radix of the tongue.

6. Equipment according to claim 4, wherein the front knife edge of the floor wall of said belly scraper is indented between the side walls and is sufficiently wide to accommodate the width of, and to cut, the pectoral nose of the front part, thereby preventing the nose from moving sidewards during the cut.

7. Equipment according to claim 4, further including a horizontally inward inclination and vertical upward inclination of the front ends of the sides of the belly scraper, to enable bumping into the gill-lid-bones and turning such bones outwards at their lower ends and inwards at their upper ends thereby directing the bones upwards and along the upper edges of the sides of the belly scraper to lift the head together with the joints of the gills away from the belly flaps.

8. Equipment as defined in claim 4, further including: elongate flat control slides disposed along each side of and spaced away from the belly scraper beam so that the slides will be outside of the belly flaps but under the cheeks and the gill lids of the front part, the slides having leading and following portions with leading portions inclined upwards and adjoined to the following portions which are horizontal, thereby to elevate, during the movement of the front part along the belly scraper, the cheeks and gill lids, relative to the belly flaps, up to a level above the uppermost edges of the belly flaps and above the uppermost edge of the sides of the belly scraper; the uppermost edges of the sides of the belly scraper and the underneath parts of the horizontal portion of the control slides being spaced-apart and providing a horizontal gap therebetween; and horizontal cutting knives are mounted in said gap, and enable the belly flaps to be cut from the other parts of the front part as the front continues movement along said belly scraper beam and the control slides.

* * * * *